United States Patent [19]

MacQuilkin et al.

[11] 4,135,640

[45] Jan. 23, 1979

[54] SAFETY CLOSURE DEVICE FOR A PRESSURE VESSEL

[75] Inventors: Arthur E. MacQuilkin, Downers Grove; Elmer J. Kulousek, Berwyn; Earl A. Borre, Itasca, all of Ill.

[73] Assignee: Industrial Filter & Pump Mfg. Co., Cicero, Ill.

[21] Appl. No.: 812,563

[22] Filed: Jul. 5, 1977

[51] Int. Cl.² .............................................. B65D 45/00
[52] U.S. Cl. ..................................... 220/316; 220/256; 220/327; 220/DIG. 20
[58] Field of Search .................. 220/316, 256, 85 P, 220/353, 211, 262, 203, 206, 208, 316, DIG. 20, 256, 327, 257; 137/377; 49/362, 276

[56] References Cited

U.S. PATENT DOCUMENTS

| 2,330,306 | 9/1943 | Murphy | 220/327 |
| 2,363,802 | 11/1944 | Quarfoot et al. | 220/316 |
| 2,818,196 | 12/1957 | Morterol | 220/256 |
| 2,852,295 | 9/1958 | Jasper | 220/267 |
| 2,927,787 | 3/1960 | Maher | 49/276 |
| 3,141,008 | 7/1964 | Flick et al. | 220/327 |
| 3,458,083 | 7/1969 | Erwin, Jr. | 220/316 |

FOREIGN PATENT DOCUMENTS 1416707 12/1975 United Kingdom ..................... 220/256

Primary Examiner—William Price
Assistant Examiner—Allan N. Shoap
Attorney, Agent, or Firm—Edmond T. Patnaude

[57] ABSTRACT

The hold-down bolts on the cover of a pressure vessel cannot be loosened until a pressure relief valve has been opened to relieve the pressure in the vessel and to release a safety member positioned over the bolts.

6 Claims, 8 Drawing Figures

SAFETY CLOSURE DEVICE FOR A PRESSURE VESSEL

The present invention relates in general to pressure vessels having covers which are removably secured to the vessels by a plurality of bolts, and it relates in particular to a new and improved method and device for preventing the loosening of said bolts while the associated vessel is pressurized.

BACKGROUND OF THE INVENTION

In order to prevent the inadvertent opening of a pressure vessel while it is under pressure, it is common practice to mount a manually operable relief valve on the cover of the vessel. In accordance with normal operating procedure the valve is first opened to connect the chamber in the vessel to the ambient, and then the hold down bolts are loosened to permit the cover to be opened. Because of unfamiliarity with this procedure or because of carelessness, the bolts have been loosened without first opening the manual relief valve, thereby subjecting the person opening the cover as well as others to possible danger.

SUMMARY OF THE INVENTION

In accordance with the present invention a method and apparatus are provided for limiting access to the cover holddown bolts until the pressure relief valve has been opened. In accordance with one aspect of this invention a cover-like safety device is maintained in a position over the hold down bolts by a latching member affixed to the valve element. Only when the valve element is in a fully open position does the latching member release the safety device so that it may be moved away from the hold-down bolts.

In accordance with another aspect of the invention the valve element is coupled to the safety device in such manner that the opening of the valve simultaneously and automatically moves the safety device away from the hold-down bolts to permit the bolts to be loosened.

GENERAL DESCRIPTION OF THE DRAWINGS

The present invention will be better understood from a reading of the following detailed description taken in connection with the accompanying drawings wherein.

DETAILED DESCRIPTION OF THE INVENTION

Figure 1:
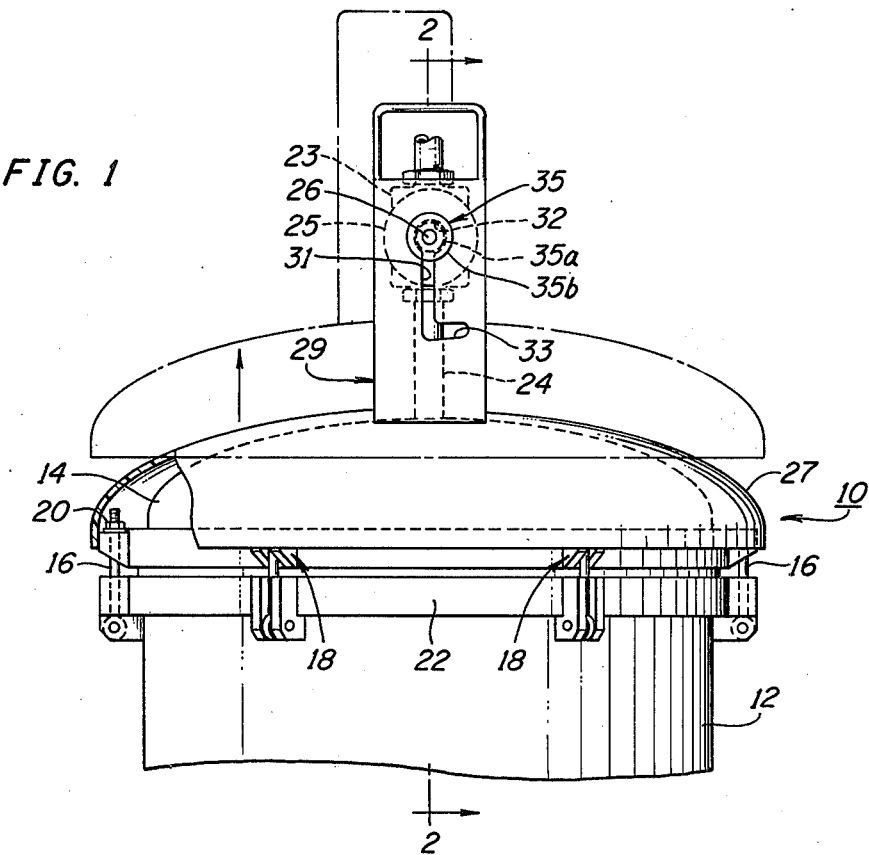
FIG. 1 is an elevational view, partly in section, of the upper portion of a pressure vessel embodying the present invention.
Figure 2:
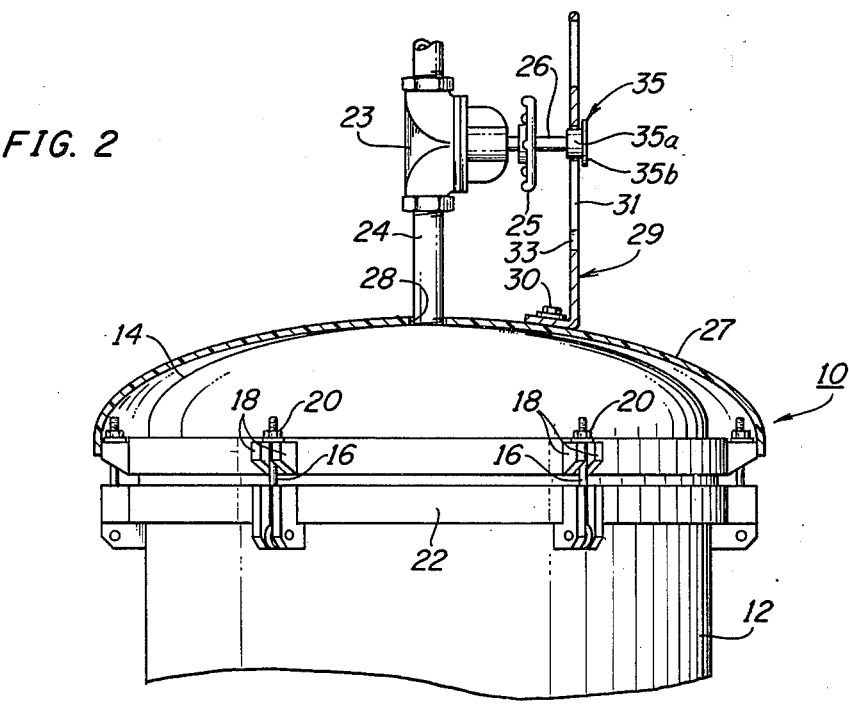
FIG. 2 is a view showing the safety device of the present invention in a closed position.

Referring to FIGS. 1 and 2, a safety closure device embodying certain aspects of the present invention is generally identified by the reference character 10. It is illustrated in combination with a vertical pressure vessel or column 12 having a cover 14 secured to the top of the vessel by a plurality of hold down bolts 16. The vessel and cover are of conventional construction wherein the hold down bolts 16 are pivotably mounted to the vessel for swinging movement between lug pairs 18. A plurality of nuts 20 respectively threaded onto the bolts 16 clamp the cover 14 in sealing relationship to an annular flange 22 at the top of the vessel 12. When opening the vessel, the nuts 20 are loosened a sufficient amount to permit the bolts to be swung out of the channels between the lugs 18. The cover 14 can then be lifted or otherwise moved away from the opening at the top of the vessel.

In order to relieve the pressure in the vessel prior to loosening the nuts 20, a manually operable valve 23 is connected in a vent line 24 running from the inside of the cover 14 to the ambient. The valve 23 includes a hand wheel 25 mounted on a stem 26. Although the valve 23 as illustrated in the drawings is a well known diaphragm valve, the present invention is not limited to any particular type of valve or valve construction.

In accordance with the present invention a dome like member 27 is slidably mounted on the conduit 24 for movement between a lower closed position as shown in full lines in FIGS. 1 and 2 and an upper open position as shown in phantom in FIG. 1. As shown in FIGS. 1 and 2, when the member 27 is in the lower closed position it completely covers the circle of bolts 16 to prevent the use of a wrench or other tool to loosen the nuts 20.

The member 27 may be a unitary plastic part and has a hole 28 for slidably receiving the pipe 24. An L-shaped bracket 29 is secured by nut and bolt assemblies 30 or the like to the member 27. The bracket 29 is provided with a slot having an elongated vertical section 31, an enlarged portion 32 at the top and a lower transverse section 33. A headed bushing 35 is secured to the end of the valve stem 26. The enlarged upper end 32 has a diameter intermediate the diameters of the body portion 35a and the head portion 35b of the bushing 35. The slot portions 31 and 33 have a width which is less than the diameter of the body portion 35a but greater than that of the stem 26 so that the valve 23 can only be closed when the member 27 is in the lower position and the bushing 35 is in the enlarged upper slot portion 32. The lower transverse slot portion 33 is provided so that after the valve 23 has been opened and the bushing 35 is clear of the bracket 29, the safety member may be lifted and then rotated to position the stem in the slot portion 33. The safety 27 is thus supported in the upper position by the stem 26 to permit easy access to the nuts 20. The valve stem 26 may then, if desired, be moved in to press the shoulder of the sleeve 35 against the face of the bracket 29 thereby to secure the safety member 27 in the raised or elevated position.

Figure 3:
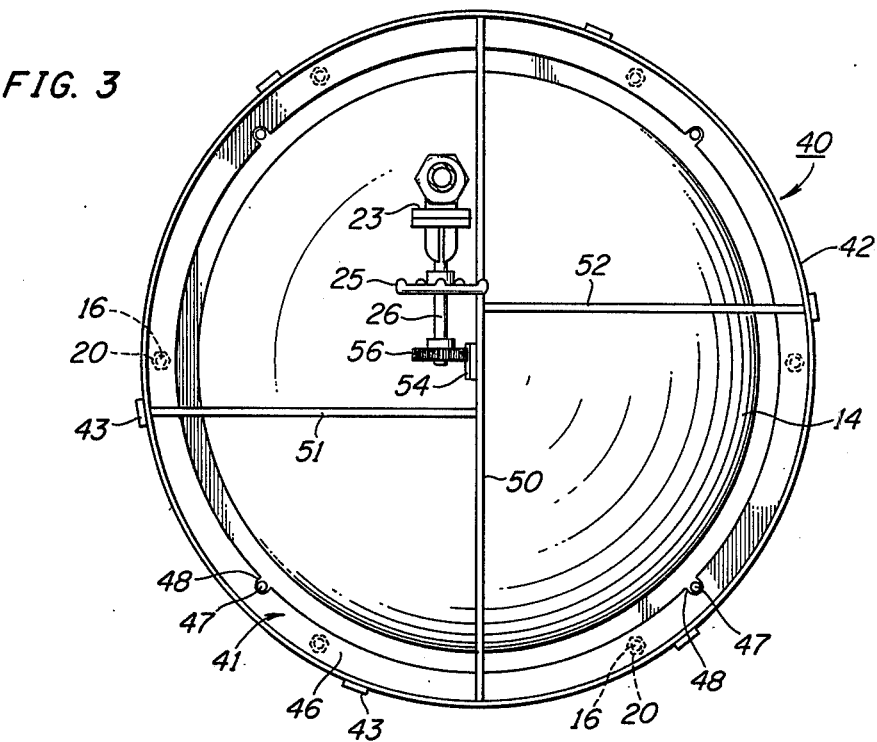
FIG. 3 is a plan view of another safety device embodying the present invention.
Figure 4:
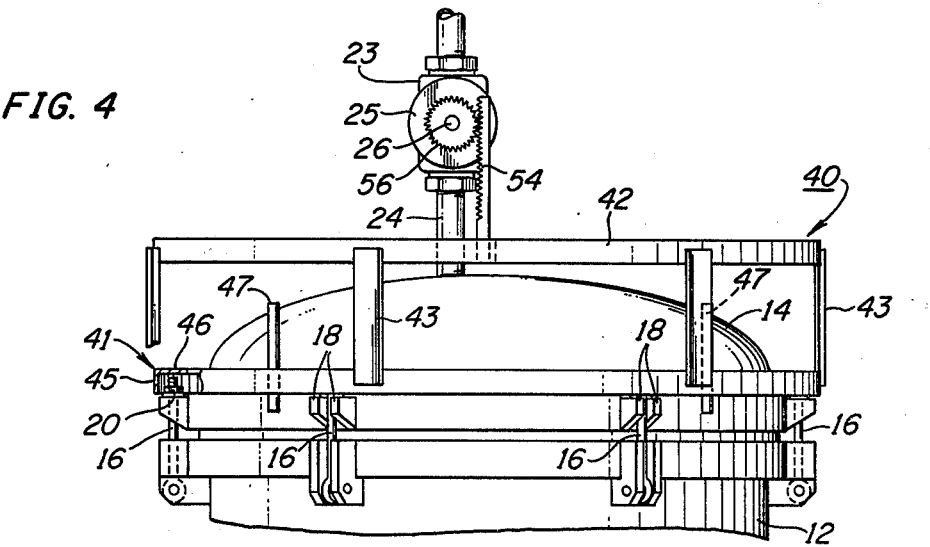
FIG. 4 is an elevational view of the device of FIG. 3.
Figure 5:
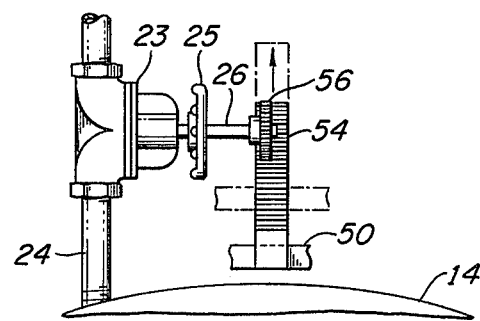
FIG. 5 is a view of the operating portion of the device of FIGS. 3 and 4.

Referring to FIGS. 3, 4 and 5, those parts which correspond to parts shown in FIGS. 1 and 2 are identified by like reference characters. In this embodiment of the invention, access to the hold-down bolt nuts 20 while the vessel 12 is pressurized is prevented by means of a safety frame 40 having a lower ring 41 connected to an upper ring 42 by a plurality of vertical members 43 welded near their ends to the rings 41 and 42. As shown in FIG. 4, the lower ring 41 has a depending external flange 45 providing a skirt lying along the outside of the nuts 20 to prevent access to the nuts 20 with an end wrench. A horizontal flange portion overlies the tops of the nuts 20 to prevent access to the nuts 20 with a socket wrench. As shown, a plurality of upstanding guide rods 47 are welded at their lower ends to the cover 14 and the flange 46 has a plurality of openings 48 slidably receiving the guide rods 47.

A rigid cross brace 50 extends diametrically across the upper ring 42 and a pair of transverse brace members 51 and 52 are interconnected between the brace 50 and the ring 42. A vertically extending gear rack 54 is mounted to the cross brace 50 in mating relationship with a pinion gear 56 keyed to the valve stem 26. As the hand wheel 25 is rotated to open the valve 23 the safety frame 40 is lifted away from the nuts 20 to permit access thereto only after valve 23 has been opened and the vessel has been vented to the atmosphere.

Figure 6:
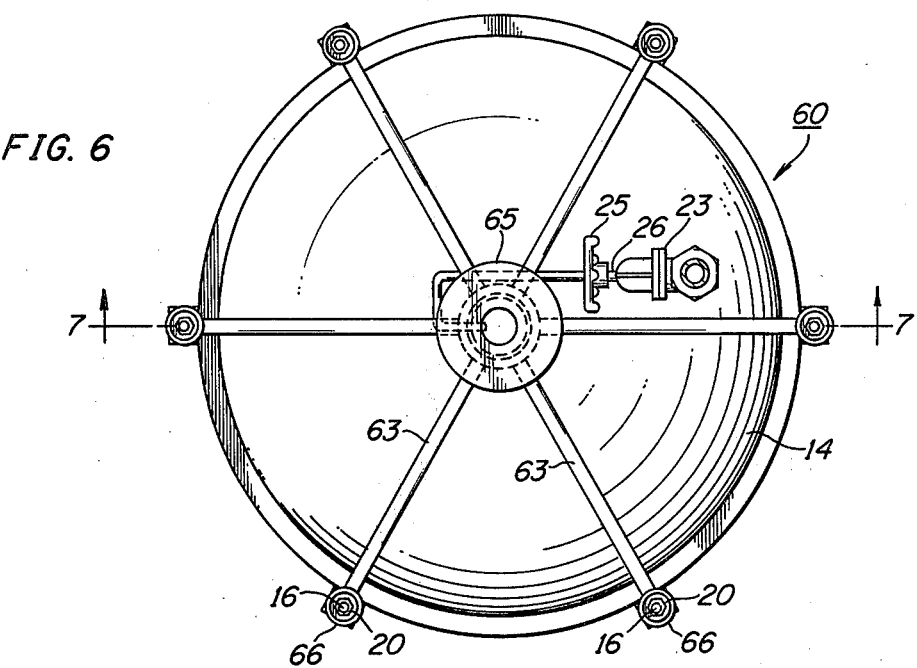
FIG. 6 is a plan view of another safety device embodying the present invention.
Figure 7:
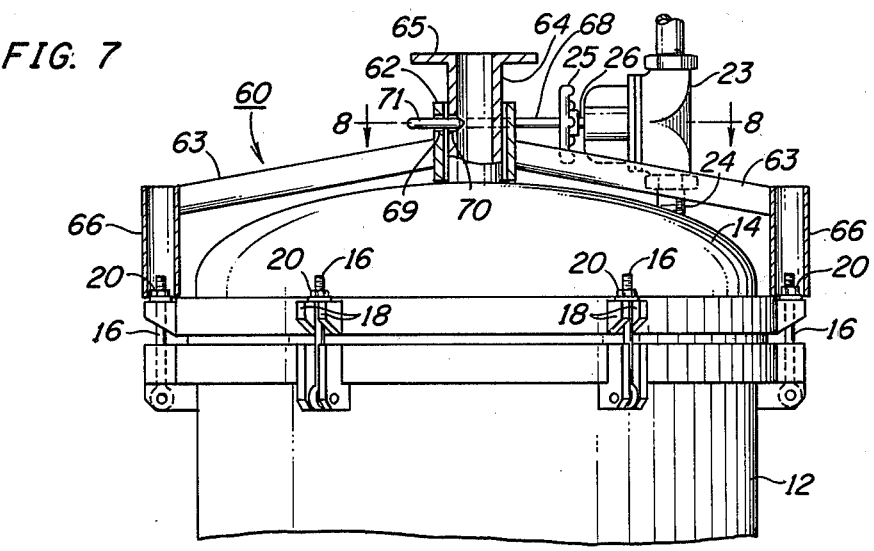
FIG. 7 is a cross-sectional view taken along the line 7—7 in FIG. 6.
Figure 8:
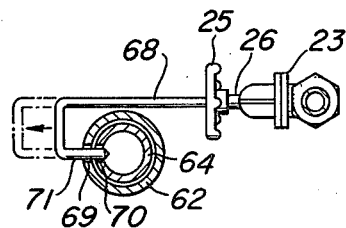
FIG. 8 is a cross-sectional view taken along the line 8—8 in FIG. 7.

Referring to FIGS. 6, 7 and 8, a safety closure frame 69 includes a centrally disposed tubular member 62 which is slidably disposed on a central guide pipe 64 extending up from the cover 14. The pipe 64 is fixedly secured to the cover 14 as by welding. An external annular flange 65 and the upper end of the guide pipe 64 prevents removal of the safety device 60 from the cover 14. A plurality of rigid tubes 66 are secured as by welding to respective ones of a plurality of radial arms 63 in positions to respectively fit over the nuts 20 when the safety frame 60 is in the lower position as shown in FIG. 7. A J-shaped hook member 68 is rotatably secured to the valve stem 26 so as to move in a horizontal direction with the valve stem. The tubes 62 and 64 are provided with holes 69 and 70 which are mutually aligned only when the frame 60 is in the lower position with the nuts 20 positioned within the tubes 66. Only when the holes 69 and 70 are aligned can the distal leg portion 71 move into the holes to permit closing of the valve 23. Moreover, the frame 60 cannot be lifted away from the nuts 20 until the valve 23 has been opened.

In use, when the cover 14 is to be opened, the hand wheel 25 is rotated to open the valve 23 and simultaneously to move the leg 71 out of the openings 69 and 70. Then the frame 60 can be lifted clear of the upper end of the bolts 16, rotated to move the tubes 66 to the side of the nuts, and then lowered so that the arms 63 rest on the top of the cover 14. The vessel having thus been vented through the valve 23, the nuts 20 can be loosened to free the cover 14 from the vessel 12.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Safety apparatus for preventing the opening of the cover of a pressurized vessel while the pressure in the vessel is different from ambient pressure, a pressure relief valve being mounted to said cover and said cover being secured to said vessel by a plurality of hold-down bolts, comprising a plurality of tubular members, support means mounting said tubular members in mutually relative positions enabling the simultaneous location thereof over respective ones of said bolts to prevent the removal of said bolts, guide means carried by said cover and cooperating with said support means between a first position wherein said tubular members are located over said bolts and a second position wherein said tubular members are not located over said bolts thereby to permit loosening of said bolts, and means connected to said relief valve for locking said support means in said first position when said relief valve is closed, whereby said bolts cannot be removed to release said cover from said vessel while said relief valve is closed.

2. Safety apparatus according to claim 1 wherein, said vessel is substantially circular in cross-section, and said safety device is movable between said first and second positions along the principal longitudinal axis of said vessel.

3. Safety apparatus according to claim 2 wherein said guide means is a tubular member lying along the said longitudinal axis of said vessel.

4. A safety device according to claim 3 wherein said support means includes a sleeve slidably disposed over said tubular member.

5. A safety device according to claim 4 wherein said sleeve and said tubular member have respective holes which are mutually aligned when said support means is in said first position, and said means connected to said relief valve comprises a hook member connected to said valve and having a leg portion which is movable into said holes as said relief valve is closed.

6. A safety device according to claim 4 wherein said sleeve is rotatable around said tubular member.

* * * * *